United States Patent
Learmonth et al.

(10) Patent No.: US 10,578,487 B2
(45) Date of Patent: Mar. 3, 2020

(54) CALIBRATION FOR FABRY PEROT SPECTRAL MEASUREMENTS

(71) Applicant: TruTag Technologies, Inc., Kapolei, HI (US)

(72) Inventors: Timothy Learmonth, Berkeley, CA (US); Ron R. Nissim, El Cerrito, CA (US); Hod Finkelstein, Berkeley, CA (US); Mark Hsu, Richmond, CA (US)

(73) Assignee: TruTag Technologies, Inc., Kapolei, HI (US)

( * ) Notice: Subject to any disclaimer, the term of this patent is extended or adjusted under 35 U.S.C. 154(b) by 0 days.

(21) Appl. No.: 15/709,370

(22) Filed: Sep. 19, 2017

(65) Prior Publication Data

US 2018/0080825 A1   Mar. 22, 2018

Related U.S. Application Data

(60) Provisional application No. 62/397,876, filed on Sep. 21, 2016.

(51) Int. Cl.
  *G01J 3/26*  (2006.01)
  *G01J 3/28*  (2006.01)
  *G01J 3/02*  (2006.01)

(52) U.S. Cl.
  CPC ............... *G01J 3/26* (2013.01); *G01J 3/0297* (2013.01); *G01J 3/28* (2013.01)

(58) Field of Classification Search
  CPC ............... G01J 3/26; G01J 3/28; G01J 3/0297
  See application file for complete search history.

(56) References Cited

U.S. PATENT DOCUMENTS

| | | | |
|---|---|---|---|
| 5,892,582 A * | 4/1999 | Bao | G01D 5/35383 250/227.27 |
| 6,504,616 B1 * | 1/2003 | Haber | G01J 3/26 356/480 |
| 7,212,292 B2 | 5/2007 | Vanbrocklin | |
| 2006/0132787 A1 | 6/2006 | Mestha | |
| 2011/0071807 A1 | 3/2011 | Hubert | |
| 2014/0176729 A1 | 6/2014 | Saari | |
| 2015/0377706 A1 * | 12/2015 | Sano | G01J 3/26 356/456 |
| 2016/0123809 A1 | 5/2016 | Learmonth | |
| 2016/0252395 A1 | 9/2016 | Tack | |

* cited by examiner

*Primary Examiner* — Michael P LaPage
(74) *Attorney, Agent, or Firm* — Van Pelt, Yi & James LLP

(57) ABSTRACT

A system for determining a calibrated spectral measurement includes a tunable Fabry-Perot etalon, a detector, and a processor. The tunable Fabry-Perot etalon has a settable gap. The detector measures light intensity transmitted through the tunable Fabry-Perot etalon. The processor is configured to determine the calibrated spectral measurement. The calibrated spectral measurement is based at least in part on a measurement set of detected light intensities for a plurality of settable gaps and a reconstruction matrix. The reconstruction matrix is based at least in part on calibration measurements using multiple source wavelengths and multiple settable gaps.

19 Claims, 4 Drawing Sheets

CALIBRATION FOR FABRY PEROT SPECTRAL MEASUREMENTS

CROSS REFERENCE TO OTHER APPLICATIONS

This application claims priority to U.S. Provisional Patent Application No. 62/397,876 entitled RGB CALIBRATION FOR A FABRY PEROT INTERFEROMETER filed Sep. 21, 2016 which is incorporated herein by reference for all purposes.

BACKGROUND OF THE INVENTION

Traditional methods for acquiring three-dimensional (x,y, $\lambda$) hyper-spectral measurements typically require intensive computational efforts and expensive optical components. However, recent advances in fabrication techniques have allowed the creation of very precise tunable Fabry-Pérot etalons that can be used for making low-cost hyper-spectral measurements. These etalons have a transmission spectrum that exhibit peaks of transmission as a function of a settable gap between two reflective glass optical flats. By collecting images using a sensor that collects light that has passed through the Fabry-Perot etalon for a defined set of gaps, it is possible to reconstruct the full three-dimensional (x,y,$\lambda$) hyper-spectral data cube of what is being imaged by the camera. However, because the etalon typically transmits multiple narrow peaks in the spectral range of interest and the camera pixel sensitivity spectra are broad and fixed, there is not a simple one-to-one mapping of pixel measurements to source spectra for a given gap, making it difficult or impossible to directly interpret the spectral content of raw image measurements.

BRIEF DESCRIPTION OF THE DRAWINGS

Various embodiments of the invention are disclosed in the following detailed description and the accompanying drawings.

DETAILED DESCRIPTION

Figure 1:
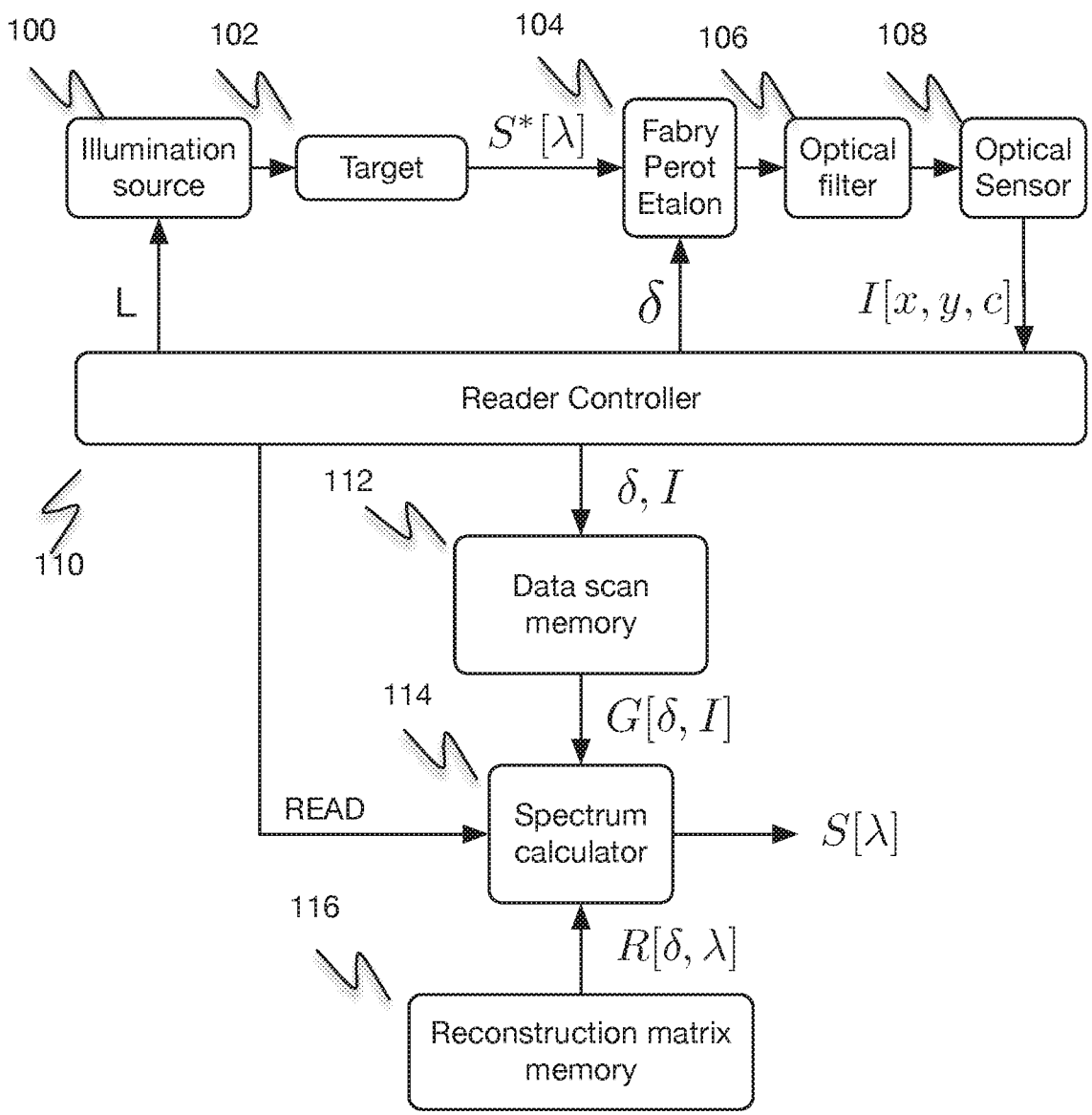
FIG. 1 is a block diagram illustrating an embodiment of a calibrated spectral measurement system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining a calibrated spectral measurement is disclosed. The system includes a tunable Fabry-Perot etalon, a detector, and a processor. The tunable Fabry-Perot etalon has a settable gap. The detector measures the light intensity transmitted through the tunable Fabry-Perot etalon. The processor is configured to determine the calibrated spectral measurement. The calibrated spectral measurement is based at least in part on a set of detected light intensities for a plurality of settable gaps and a reconstruction matrix. The reconstruction matrix is based at least in part on calibration measurement using multiple source wavelengths and multiple settable gaps.

A system for determining a calibrated spectral measurement comprises an illumination source, a Fabry-Perot etalon with a settable gap, an optical system filter, and an optical sensor array (e.g., a camera). The optical system filter sets the range over which the target spectrum is acquired and helps to constrain and thereby improve the spectral reconstruction associated with the target. To acquire a three-dimensional (x,y,$\lambda$) hyper-spectral cube measurement of the target, a controller sets the illumination source and acquires a set of images from the camera for a set of settings of the etalon gap. These images are indexed by the gap value and stored in a data scan memory. Once a complete set of images has been acquired (e.g., one for each of the set of settings of the etalon gap), the controller sends a READ signal to a spectrum calculator. The spectrum calculator uses a previously calculated calibrated reconstruction matrix and a set of gap images to estimate the target's optical spectrum. A matrix product, comprising the indexed gap images and the reconstruction matrix, is used to calculate an optical spectrum estimate.

A system for determining a calibrated reconstruction matrix comprises a settable structured illumination source, a calibrated spectrometer for measuring the illumination source spectrum, a Fabry-Perot etalon with a settable gap, an optical system filter, and an optical sensor array such as a camera. The optical system filter sets the range over which the target spectrum is acquired. A calibration controller sets the settable structured illumination source to one of a set of illumination structure types (e.g., a narrow band illumination defined by its peak frequency) and to one of a set of settable gaps of the Fabry-Perot etalon. For each gap and illumination type, the controller stores the measured illumination spectrum and an image from the camera in a calibration scan memory. Once all sets of illumination types and etalon gaps have been acquired in the calibration scan memory, the controller sends a calibration signal to the calibration processor to process the calibration scan data. The calibration processor calculates the reconstruction matrix using a linear model with regularization (e.g. $L_1$, $L_2$, or $L_0$ regularization) and stores the resulting reconstruction matrix (e.g., in a reconstruction matrix memory).

In contrast to traditional Fabry-Perot etalon-based spectrometers that attempt to estimate the source spectrum from independent gap measurements, the disclosed system for hyper-spectral cube measurements is able to resolve ambiguities and eliminate spectral estimation artifacts by using information from the full set of gap measurements. In addition, the framework disclosed is able to work with a wide variety of illumination source types including narrow band, multiband, and broadband, as well as a wide variety of cameras such as a red-green-blue (RGB) camera, a red-green-blue and infrared (RGB+IR) camera, a monochrome camera, or a multispectral camera.

FIG. 1 is a block diagram illustrating an embodiment of a calibrated spectral measurement system. In the example shown, target 102 is illuminated with illumination source 100. The parameters specifying illumination source 100 are provided by a signal L. Light from illumination source 100 is scattered by target 102 with spectrum $S^*(\lambda)$ and passes through Fabry-Perot etalon 104 with a settable gap specified by a signal $\delta$. The system includes optics (e.g., a lens to collimate the light from the illumination source) to collimate light that enters the Fabry-Perot etalon. Light coming out of Fabry-Perot etalon 104 passes through an optical filter 106 (e.g., a broad band-pass filter) and is detected by optical sensor 108. Filter 106 may incorporate a fixed spectral bandpass filter (or a low pass and high pass combination which creates an effective bandpass filter). Reader controller 110 receives image data I[x,y,c] from optical sensor 108 for each setting of the Fabry-Perot gap $\delta$ and light source L and stores the image data I[x,y,c] for each gap setting $\delta$ in data scan memory 112. For example, the image data I contains c pixel types (e.g. red, green, blue) at locations x,y. After a complete set of data has been acquired for each gap setting $\delta$, reader controller 110 sends a READ signal to a spectrum calculator instructing it to calculate the target spectrum estimate $S[\lambda]$. Spectrum calculator 114 reads in the data from data scan memory 112 as matrix $G[\delta,I]$ and reads in a reconstruction matrix $R[\delta,\lambda]$ from reconstruction matrix memory 116. Spectrum calculator 114 then multiplies matrix $G[\delta,I]$ by matrix $R[\delta,\lambda]$ to get the target spectrum estimate $S[\lambda]$. In some embodiments, where there are multiple pixel values (x,y) processed by spectrum calculator 114, the spectral estimate $S[\lambda]$ will be a three-dimensional $S[x,y,\lambda]$ hyper-spectral measurement.

In some embodiments, illumination source 100 is a broadband source such as a halogen lamp. In some embodiments, illumination source 100 is a composite source such an array of LEDs. In some embodiments, illumination source 100 is optimized for the detection of particular target by matching the illumination source spectrum to the target's reflection spectrum. In some embodiments, Fabry-Perot etalon 104 is a pair of cascaded Fabry-Perot etalons with settable gaps specified by a pair of signals $[\delta_1, \delta_2]$. In contrast to a single Fabry-Perot etalon, which typically has multiple peaks of transmission in the range of interest, a pair of cascaded Fabry-Perot etalons with different gap settings can be set to pass a single narrow band of light in the range of interest. For example, if the gaps $[\delta_1, \delta_2]$ specify different transmission orders for the two etalons, a single narrow band of transmission is passed. Detection of such a single band of light from a pair of cascaded Fabry-Perot etalons by optical sensor 108 resolves the ambiguity associated with assigning spectral estimates to multiple bands when using a single Fabry-Perot etalon.

In various embodiments, optical sensor 108 comprises a red-green-blue (RGB) camera, a red-green-blue and infrared (RGB+IR) camera, a monochrome camera, a multi spectral camera, or any other appropriate sensor.

In some embodiments, the spectral estimate $S[\lambda]$ will be a spatially weighted average. For example, the spectral estimate $S[\lambda]$ is an average over the central region of optical sensor 108. In some embodiments, the three-dimensional spectral estimate $S[x,y,\lambda]$ will be a spatially weighted average from a plurality of sensor regions.

In some embodiments, spectrum calculator 114 uses a priori knowledge of the target spectrum to estimate spectral features of the target. For example, if the target spectra $S^*(\lambda)$ is known to have a finite number of peaks, spectrum calculator 114 may use a reconstruction matrix designed to map the peaks in the optical sensor measurement to peaks in the spectral estimate $S[\lambda]$.

In some embodiments, reconstruction matrix memory 116 contains multiple reconstruction matrices optimized for various conditions of the device. For example, spectrum calculator 114 for various temperature conditions of the device may use a second reconstruction matrix.

In some embodiments, reconstruction matrix memory 116 contains reduced descriptions of the reconstruction matrix for faster spectral estimation and better noise immunity. For example, the reconstruction matrix is estimated using a small number of principle components. This estimated reconstruction matrix comprises a reduced reconstruction matrix (determined using the reduced description of the reconstruction matrix) that is used in place of the reconstruction matrix.

Figure 2:
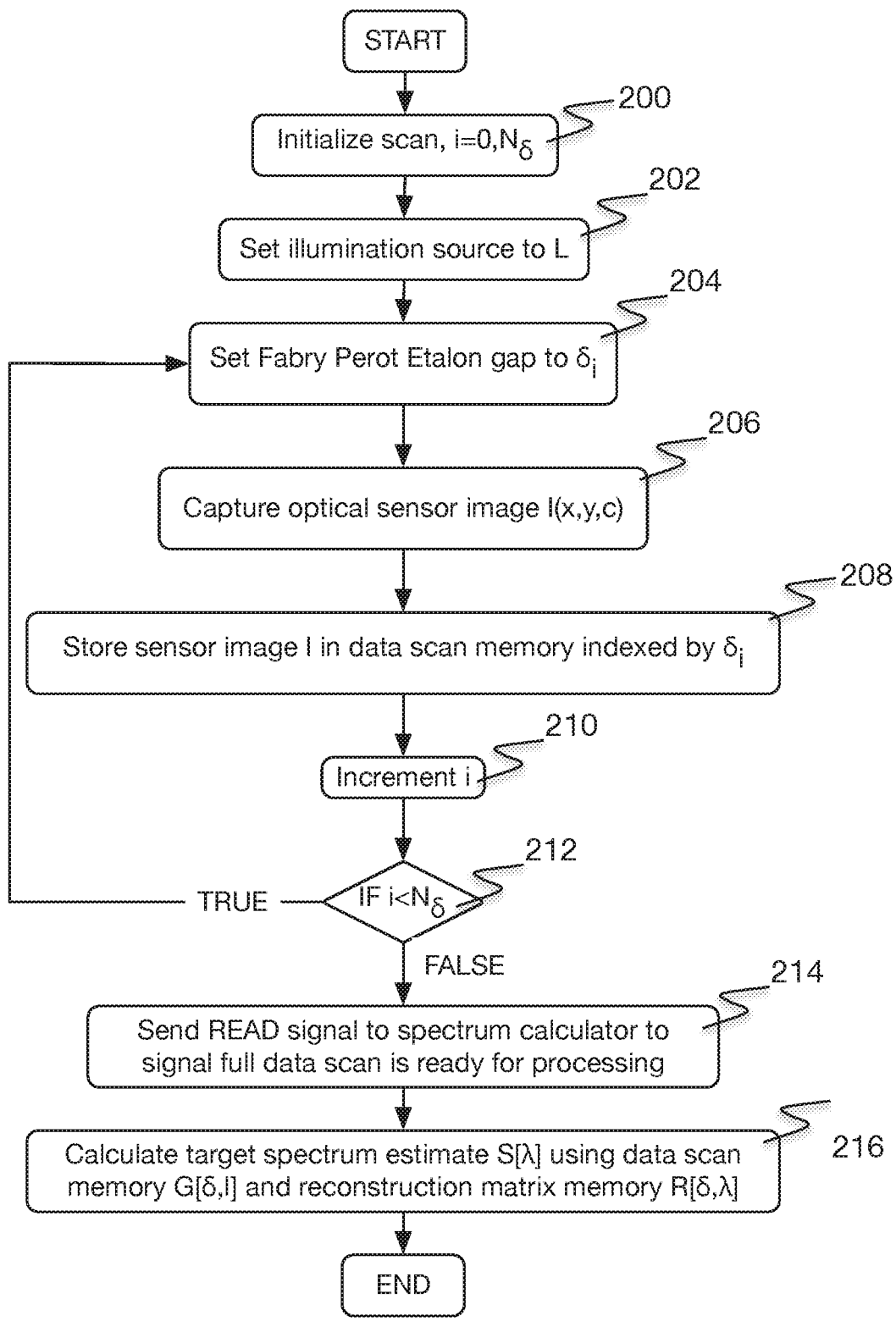
FIG. 2 is a flow diagram illustrating an embodiment of a process for reading a calibrated spectral measurement.

FIG. 2 is a flow diagram illustrating an embodiment of a process for reading a calibrated spectral measurement. In some embodiments, the process of FIG. 2 is executed by the system shown in FIG. 1. In the example shown, in 200, a scan is initialized. For example, the spectral measurement system is initialized; the index i for the set of Fabry-Perot gap settings $\delta$, is set to zero and the number of gap settings $N_\delta$ is defined. In 202, the illumination source is changed to type L. For example, the illumination source is turned on and specified by parameters L. L may specify a narrow or broadband source. In 204, the gap for the Fabry-Perot etalon is set to $\delta_i$. The setting of the gap for the Fabry-Perot etalon results in spectrally filtered light, which is then imaged at an optical sensor. For example, $\delta_i$ might set the Fabry-Perot etalon to a 500 nm gap for i=0. In 206, an optical sensor image I(x,y,c) is captured. For example, an image I[x,y,c] is captured of the light scattered from a target that is illuminated using the light coming out of the Fabry-Perot etalon. In some embodiments, the optical sensor is a high definition RGB camera and the data image I has dimensions I[1920, 1080,3]. In 208, the data image I is stored in the data scan memory indexed by $\delta_i$. For example, each image I in the data scan memory is indexed by a specific gap setting $\delta_i$. In 210, the gap setting index i is incremented; for example, i is increased by 1. In 212, it is determined whether i is less than $N_\delta$. For example, the index i is compared to the maximum value N. In the event that i is less than $N_\delta$, control passes to 204. For example, in the event that the index i is less than the maximum $N_\delta$, then the scanning dataset is not yet complete and the next Fabry-Perot etalon gap is set in 204 and the data capturing process continues in 206 and 208. In the event that i is not less than $N_\delta$, then control passes to 214. For example, in the event that the index i is greater than or equal to the maximum $N_\delta$, the data capturing process loop ends. In 214, a READ signal is sent to the spectrum calculator to signal a full data scan is ready for processing. For example, the reader controller sends a signal READ to the spectrum calculator to signal that the data in the data scan memory is ready for processing. In 216, a target spectrum estimate $S[\lambda]$ is calculated using data scan memory $G[\delta,I]$ and reconstruction matrix memory $R[\delta,\lambda]$. For example, the spectrum calculator calculates a hyperspectral data cube estimate $S(x,y,\lambda)$ of the target using the data $G[\delta,I]$ stored in the data scan memory and the reconstruction matrix $R[\delta,\lambda]$ stored in the reconstruction matrix memory. In some embodiments, the hyperspectral data cube estimate $S(x,y,\lambda)$ can be calculated by multiplying the data scan matrix $G[\delta,I]$ by the reconstruction matrix $R[\delta,\lambda]$.

Figure 3:
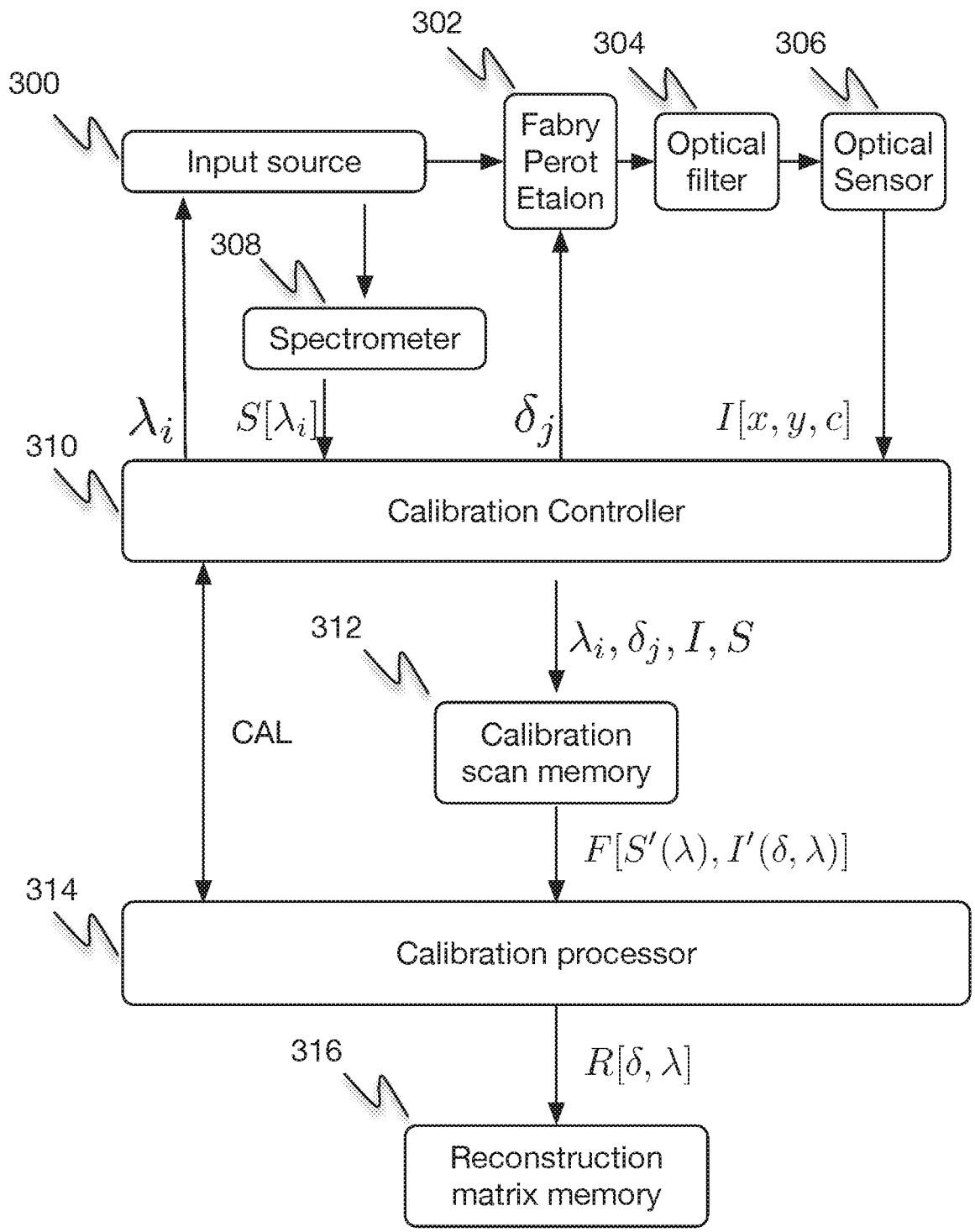
FIG. 3 is a block diagram illustrating an embodiment of a system to calibrate a spectral measurement system of FIG. 1.

FIG. 3 is a block diagram illustrating an embodiment of a system to calibrate a spectral measurement system of FIG. 1. In the example shown, light from input source 300 is set to one of a plurality of spectral structure types specified by $\lambda_i$. For example, $\lambda_i$ may specify a narrow band light source (e.g., a light source with half-width of 2 nm) with center wavelength equal to $\lambda_i$. In some embodiments, the input source includes multi-peaked types or broadband spectra types where the types are specified by the parameter $\lambda_i$. The light from input source 300 with spectra type $\lambda_i$ is passed to spectrometer 308 and Fabry-Perot etalon 302. Spectrometer 308 records the measured spectrum $S[\lambda_i]$ generated by input source 300 with spectral structure specified by $\lambda_i$. Light from input source 300 with spectrum $S(\lambda_i)$ passes through Fabry-Perot etalon 302 with a settable gap specified by a signal $\delta_j$. Light coming out of Fabry-Perot etalon 302 passes through optical filter 304 (e.g., a broad band-pass filter) and is detected by optical sensor 306. Calibration controller 310 receives image data $I[x,y,c]$ from optical sensor 306 for each setting of the Fabry-Perot gap $\delta_j$ and light source type $\lambda_i$ and stores the image data $I[x,y,c]$ and measured spectrum $S[\lambda_i]$ for each gap setting $\delta_j$ and input source type $\lambda_i$ in calibration scan memory 312. After a complete set of data $F[S'(\lambda_i),I'(\delta\_j,\lambda_i)]$ has been acquired for each gap setting $\delta_j$ and each input source type $\lambda_i$, calibration controller 310 sends a CAL signal to calibration processor 314 instructing it to calculate the reconstruction matrix $R[\delta, \lambda]$ using calibration scan data memory 312. Calibration processor 314 then reads in the calibration data $F[S'(\lambda),I'(\delta,\lambda)]$ from calibration memory 312 and computes a reconstruction matrix R using a linear model $S=RI$ to estimate the input source spectrum S. For example, the optimal reconstruction matrix can be computed using a least squares cost function between the linear model $S=RI$ and the measured spectrum together with $L_1$ regularization. In various embodiments, the optimal reconstruction matrix is computed using a least squares cost function between the linear model $S=RI$ and the measured spectrum together with $L_1$ or $L_0$ regularization. In various embodiments, least absolute shrinkage and selection operator (LASSO), stochastic gradient decent, or expectation-maximization methods are used for $L_1$ regularization, or any other appropriate method may be used to solve the linear model with a convex cost function. In various embodiments, orthogonal matching pursuit or locally competitive algorithms are used for $L_0$ regularization or any other appropriate method may be used to solve the linear model. Calibration processor 314 then stores the optimal reconstruction matrix $R[\lambda]$ in reconstruction matrix memory 316. In some embodiments, the linear model has a constant term. For example, the linear model is $S=RI+R0$ where R0 is a constant term. In some embodiments, R is determined using a pseudo-inverse For example, a radiometer is used to measure the transmitted power at each wavelength $\lambda_i$ and gap setting $\delta_j$. For each gap setting $\delta_j$, a narrowband source $\lambda_i$ is scanned over the spectral range and the average red, green, and blue values from the sensor 306 at each wavelength setting $\lambda_i$ are scaled by the radiometer output and saved. The transmission spectrum for each gap $\delta_i$ is placed into a row of a matrix that when inverted using the pseudo-inverse, results in the reconstruction matrix R.

In some embodiments, the spectrum of illumination source 300 comprises multiple narrow bands. For example, illumination source 300 may be generated from broadband source such as a halogen lamp that is passed through a second Fabry-Perot etalon. In some embodiments, illumination source 300 is a composite source such as an array of LEDs.

In various embodiments, optical sensor 306 comprises a red-green-blue (RGB) camera, a red-green-blue and infrared (RGB+IR) camera, a monochrome camera, a multi spectral camera, or any other appropriate sensor.

In some embodiments, the image data I will be a spatially weighted average. For example, the image data is an average over the central region of optical sensor 306. In some embodiments, the image data I will be a spatially weighted average from a plurality of sensor regions.

In some embodiments, calibration processor 312 uses a priori knowledge of the target spectrum to estimate spectral features of the target. For example, if the target spectra $S^*(\lambda)$ is known to have a finite number of peaks, calibration processor 312 may calculate a reconstruction matrix designed to map the peaks in the optical sensor measurement to peaks in the spectral estimate $S[\lambda]$.

In some embodiments, reconstruction matrix memory 316 contains multiple reconstruction matrices optimized for various conditions of the device. For example, calibration processor 312 may calculate a reconstruction matrix for various temperature conditions of the device.

In some embodiments, reconstruction matrix memory 316 contains reduced descriptions of the reconstruction matrix for faster spectral estimation and better noise immunity. For example, the reconstruction matrix is estimated using a small number of principle components. This estimated reconstruction matrix comprises a reduced reconstruction matrix (determined using the reduced description of the reconstruction matrix) that is used in place of the reconstruction matrix.

Figure 4:
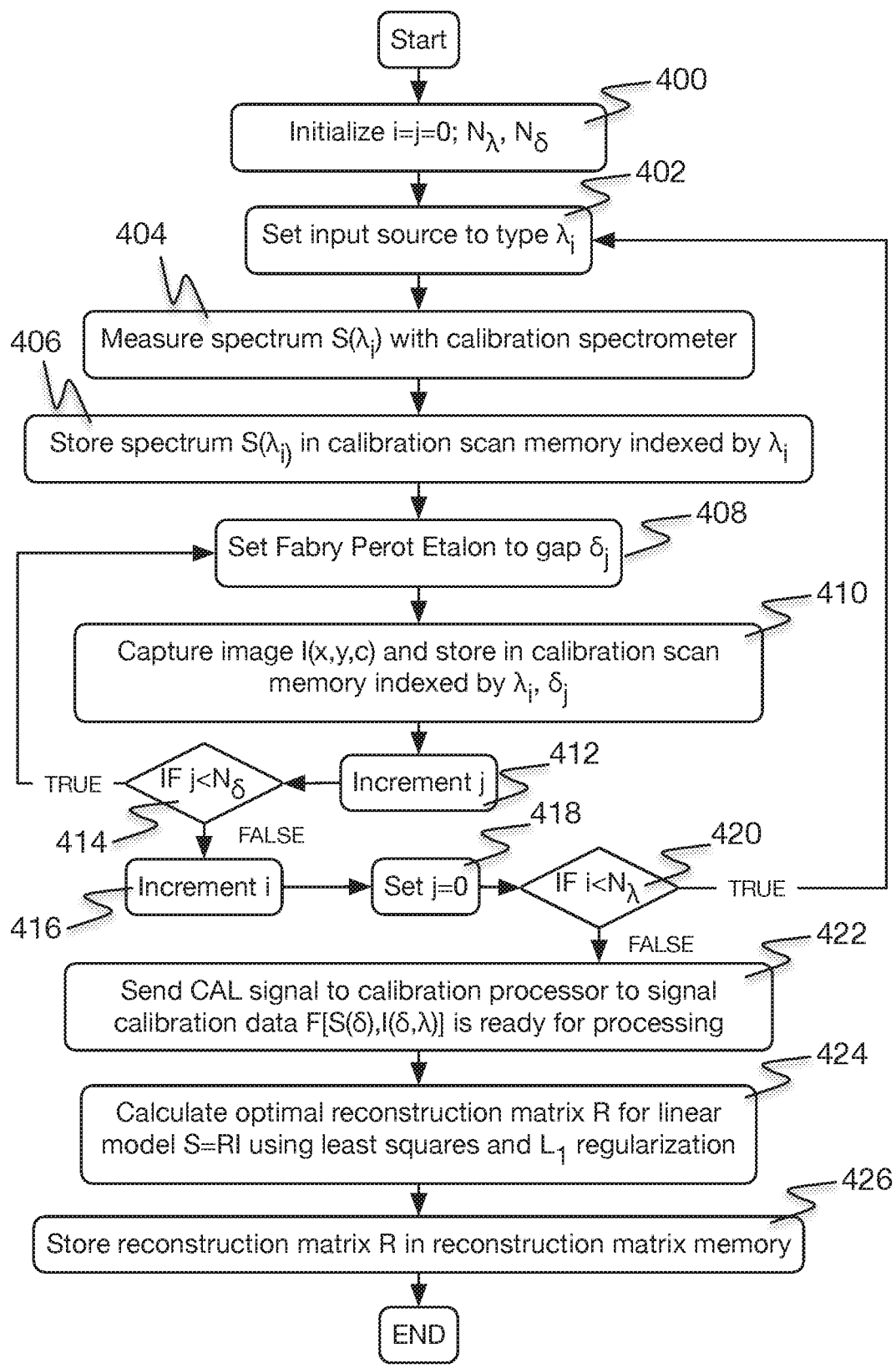
FIG. 4 is a flow diagram illustrating an embodiment of a process for calibrating a spectral measurement system of FIG. 1.

FIG. 4 is a flow diagram illustrating an embodiment of a process for calibrating a spectral measurement system of FIG. 1. In some embodiments, the process of FIG. 4 is executed by the system shown in FIG. 3. In the example shown, in 400, a calibration system is initialized. For example, the calibration process is initialized; the index j for the set of Fabry-Perot gap settings $\delta_j$ and the index i for the set of input source spectral structure types $\lambda_i$ is set to zero and the number of gap settings $N_\delta$ and the number of source types $N_\lambda$ is defined. In 402, the illumination source type is set to $\lambda_i$. In 404, the spectrum $S[\lambda_i]$ of input source 300 with source type $\lambda_i$ is measured using spectrometer 308. In 406, the spectrum measured in process 404 is stored in calibration scan memory 312 and indexed by the spectrum type $\lambda_i$. In 408, the gap for the Fabry-Perot etalon is set to $\delta_j$. The setting of the gap for the Fabry-Perot etalon results in spectrally filtered light, which is then imaged at an optical sensor. For example, $\delta_j$ might set the Fabry-Perot etalon to a 500 nm gap for j=0. In 410, an optical sensor image $I(x,y,c)$ is captured and stored in a calibration scan memory. For example, an image $I[x,y,c]$ is captured of the light from input source type $\lambda_i$ that has passed through of the Fabry-Perot etalon. In some embodiments, the optical sensor is a high definition RGB camera and the data image I has dimensions I[1920,1080,3]. The data image I is stored in the calibration scan memory indexed by input source type $\lambda_i$ and etalon gap type $\delta_j$. For example, each image I in the data scan memory is indexed by a specific gap setting $\delta_j$ and specific source type $\lambda_i$. In 412, gap setting index j is incremented; for example, j is increased by 1. In 414, it is determined whether j is less than $N_\delta$. For example, the index j is compared to the maximum value $N_\delta$. In the event that j is less than $N_\delta$, control passes to 408. For example, in the event that the index j is less than the maximum $N_\delta$, then the scanning dataset is not yet complete and the next Fabry-Perot etalon gap is set in 408 and the data capturing process continues in 410. In the event that j is not less than $N_\delta$, then control passes to 416. For example, in the event that the index j is greater than or equal to the maximum $N_\delta$, the data capturing process loop ends for scanning over all gaps. In 416, the source type index i is incremented; for example, i is increased by 1. In 418, the gap setting index j is reset to zero in preparation for a scan over all $N_\delta$ gaps for a new input source type $\lambda_i$. In 420, it is determined whether i is less than $N_\lambda$. For example, the index i is compared to the maximum value $N_\lambda$. In the event that i is less than $N_\lambda$, control passes to 402. For example, in the event that the index i is less than the maximum $N_\lambda$, then the scanning dataset is not yet complete and the next input source type is selected and the data capturing process continues in 404, 406, 408, and 410. In the event that i is not less than $N_\lambda$, then control passes to 422. For example, in the event that the index i is greater than or equal to the maximum $N_k$, the data capturing process loop ends. In 422, a CAL signal is sent to the calibration processor to signal that the calibration data $F[S'(\lambda_i), I'(\delta_j, \lambda_i)]$ is ready for processing. In 424, optimal reconstruction matrix R is calculated for linear model S=RI using least squares and L1 regularization. For example, calibration processor then reads in the calibration data $F[S'(\lambda), I'(\delta, \lambda)]$ from the calibration memory and computes a reconstruction matrix R using a linear model S=RI to estimate the input source spectrum S. In 426, reconstruction matrix R is stored in reconstruction matrix memory. For example, the calibration processor stores the optimal reconstruction matrix $R[\lambda]$ in the reconstruction matrix memory.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a calibrated spectral measurement, comprising:
   a tunable Fabry-Perot etalon, wherein the tunable Fabry-Perot etalon has a settable gap;
   a detector, wherein the detector measures light intensity transmitted through the tunable Fabry-Perot etalon; and
   a processor configured to determine the calibrated spectral measurement, wherein the calibrated spectral measurement is based at least in part on a measurement set of detected light intensities for a plurality of settable gaps and a reconstruction matrix, wherein the reconstruction matrix is based at least in part on calibration measurements using multiple source wavelengths and multiple settable gaps, and wherein the reconstruction matrix is calculated using least squares and L1 regularization.

2. The system as in claim 1, wherein the settable gap ranges from 500 nm to 1500 nm.

3. The system as in claim 1, wherein the detector comprises an RGB detector.

4. The system as in claim 1, wherein the detector comprises an RGB and IR detector.

5. The system as in claim 1, wherein the detector comprises a monochrome detector.

6. The system as in claim 1, wherein the detector comprises a multiple band detector.

7. The system as in claim 1, wherein one set of the calibration measurements is made using a single narrow wavelength and by detecting intensity for each of a set of the multiple settable gaps.

8. The system as in claim 7, wherein the one set of the calibration measurements is one of a plurality of sets of the calibration measurements each taken using a different single narrow wavelength.

9. The system as in claim 8, wherein the reconstruction matrix is a linear model calculated from the calibration measurement matrix.

10. The system as in claim 8, wherein the calibration measurement matrix is simplified to determine a simplified calibration measurement matrix.

11. The system as in claim 10, wherein the calibrated spectral measurement is determined by multiplying a simplified measurement set of detected light intensities and the reconstruction matrix.

12. The system as in claim 11, wherein the calibrated spectral measurement is determined by multiplying a simplified measurement set of detected light intensities and the reconstruction matrix.

13. The system as in claim 8, wherein a reduced reconstruction matrix is used in place of the reconstruction matrix, wherein the reduced reconstruction matrix is determined using a reduced description of the reconstruction matrix.

14. The system as in claim 1, wherein the multiple source wavelengths are narrow band.

15. The system as in claim 14, wherein the plurality of the sets of the calibration measurements are built into a calibration measurement matrix.

16. The system as in claim 15, wherein the calibrated spectral measurement is determined by multiplying the measurement set of detected light intensities and the reconstruction matrix.

17. The system as in claim 16, wherein the reconstruction matrix is a linear model calculated from the calibration measurement matrix.

18. A method for determining a calibrating spectral measurement, comprising:
   providing a tunable Fabry-Perot etalon, wherein the tunable Fabry-Perot etalon has a settable gap;
   providing a detector, wherein the detector measures light intensity transmitted through the tunable Fabry-Perot etalon; and
   determining, using a processor, the calibrated spectral measurement, wherein the calibrated spectral measurement is based at least in part on a measurement set of detected light intensities for plurality of settable gaps and a reconstruction matrix, wherein the reconstruction matrix is based at least in part on calibration measurements using multiple source wavelengths and multiple settable gaps, and wherein the reconstruction matrix is calculated using least squares and L1 regularization.

19. A computer program product for determining a calibrating spectral measurement, the computer program product being embodied in a non-transitory computer readable storage medium and comprising computer instructions for:

receiving a light intensity transmitted through a tunable Fabry-Perot etalon measured by a detector, wherein the tunable Fabry-Perot etalon has a settable gap; and determining the calibrated spectral measurement, wherein the calibrated spectral measurement is based at least in part on a measurement set of detected light intensities for plurality of settable gaps and a reconstruction matrix, wherein the reconstruction matrix is based at least in part on calibration measurements using multiple source wavelengths and multiple settable gaps, and wherein the reconstruction matrix is calculated using least squares and L1 regularization.

\* \* \* \* \*

UNITED STATES PATENT AND TRADEMARK OFFICE
CERTIFICATE OF CORRECTION

PATENT NO. : 10,578,487 B2
APPLICATION NO. : 15/709370
DATED : March 3, 2020
INVENTOR(S) : Timothy Learmonth et al.

Page 1 of 1

It is certified that error appears in the above-identified patent and that said Letters Patent is hereby corrected as shown below:

In the Specification

In Column 4, Line 6, delete "multi spectral" and insert --multispectral--, therefor.
In Column 4, Line 41, delete "gap settings $\delta$," and insert --gap settings $\delta_i$--, therefor.
In Column 4, Line 61, after "value", delete "N" and insert --$N_\delta$--, therefor.
In Column 6, Line 18, delete "multi spectral" and insert --multispectral--, therefor.

Signed and Sealed this
Twenty-second Day of September, 2020

Andrei Iancu
*Director of the United States Patent and Trademark Office*